MAGNETIC-TAPE DROP-OUT COMPENSATOR

Original Filed Nov. 23, 1953 3 Sheets-Sheet 1

INVENTOR.
WAYNE R. JOHNSON

BY Lippincott & Smith.
ATTORNEYS

MAGNETIC-TAPE DROP-OUT COMPENSATOR

Original Filed Nov. 23, 1953 3 Sheets-Sheet 2

INVENTOR.
WAYNE R. JOHNSON

BY Lippincott & Smith.
ATTORNEYS

MAGNETIC-TAPE DROP-OUT COMPENSATOR

Original Filed Nov. 23, 1953 3 Sheets-Sheet 3

INVENTOR.
WAYNE R. JOHNSON
BY
Lippincott & Smith.
ATTORNEYS

United States Patent Office

Re. 24,956
Reissued Mar. 28, 1961

24,956

MAGNETIC-TAPE DROP-OUT COMPENSATOR

Wayne R. Johnson, Los Angeles, Calif., assignor to Minnesota Mining and Manufacturing Company, St. Paul, Minn., a corporation of Delaware Original No. 2,816,162, dated Dec. 10, 1957, Ser. No. 393,844, Nov. 23, 1953. Application for reissue Feb. 12, 1959, Ser. No. 792,937

18 Claims. (Cl. 178—6.6)

Matter enclosed in heavy brackets [ ] appears in the original patent but forms no part of this reissue specification; matter printed in italics indicates the additions made by reissue.

This invention relates to the reproduction of television signals recorded on a magnetic medium, and particularly to means and methods for compensation of "drop-outs" or gaps in the reproduced signals due to imperfections in the recording medium.

The band of frequencies which must be recorded and reproduced in order to provide a satisfactory television image, under present standards of transmission, comprises those extending from zero (direct current) to four million cycles. The upper portions of this band include frequencies which are far too high for practical recording by the simple methods which are applicable to the relatively narrow sound spectrum. In the system for which the present invention is specifically intended the original signal is effectively broken up into a plurality of different wave trains which are separately recorded, reproduced, and recombined to reconstitute a signal which closely approximates the original. This system is described in detail in copending applications of John Mullin, Serial No. 195,612, filed November 14, 1950, (*now Patent No. 2,794,066*), and of the present inventor, Serial Nos. 272,083, (*now Patent No. 2,867,685*), 272,084 (now Patent No. 2,694,748) and 272,085 (now Patent No. 2,695,331), filed February 18, 1952. Briefly, in accordance with the inventions described in these copending applications, a carrier frequency is generated which is a subharmonic of the highest frequency which the recording system is intended to reproduce, and which is within the recording capabilities of the electromagnetic transducers used for recording and reproduction. From this carrier frequency pulses are developed having a fundamental frequency equal to that of the carrier. These pulses are supplied to a plurality of circuits in different phases, the train of pulses supplied to each circuit being phase-displaced with respect to those in other circuits by successive increments so that, considering the circuits as a whole, pulses occur at uniform intervals, there being a pulse for each picture element which is to be reproduced. The pulses in any one of the circuits, however, occur at the frequency of the carrier. These pulses, when they occur, are modulated by the instantaneous amplitude television signals, which is then recorded as a plurality of amplitude-modulated tracks disposed in parallel upon the common medium. In reproduction, each of these tracks is engaged by a separate transducer head and fed into a separate circuit. The recorded waves are preferably distorted somewhat from the simple sine form and flattened at the top so that there is a relatively long portion of the half-cycle of the recorded wave when their amplitude is of maximum value. A wave of the same frequency as the original carrier is developed, and divided into separate trains of similarly phase-displaced pulses. These pulses are used to sample the flat topped half-cycles developed in the various channels and to switch the instantaneous samples thus taken into a common channel, thus reconstructing the original signal.

The method of television transcription thus described produces excellent television images as long as the recording medium is free from defects. Frequently, however, the oxide coating on the tape, which is the preferred recording medium, has in it either a pin hole or a small granule which projects above the surface. In either case the result is a "drop out," where the signal from one or more of the transducer heads fails to record or to reproduce. This produces a defect in the image on the screen; a series of dark or black dots across the field of view.

As has been stated the television signal contains all frequencies from zero to a maximum of 4 mc. The zero frequency or D.C. component represents the average illumination of the picture field, around which illumination varies to give bright or dark detail. A change of scene will, of course, vary the magnitude of the D.C. component. Furthermore, where there are differences in average illumination across the field there will be superimposed, upon the D.C. component, frequency components which may vary, at harmonics of the field and line frequencies, up to the highest frequencies transmitted, the low frequencies merging gradually with the high. The total interruption of the signal by a drop-out represents a pulse of opposite sign to the D.C. component and superimposed low frequency components which carries the instantaneous value of the picture current to zero. How many of the transducer heads such a drop-out affects depends on the nature of the imperfection causing it. A pin hole will probably affect only one or possibly two heads. A granule may lift the tape away from a number of heads causing more black dashes, more closely spaced on the screen. Owing to a combination of mechanical and electrical effects a single drop-out may affect as many as three lines. Drop-outs occur at random; the chance that one will occur in the same part of the picture field in two successive frames is very small, but they may occur several times per second in each track, so that they seriously affect the over-all picture, making it "noisy."

The individual transducer heads treat each signal individually, without regard to what the other heads are reproducing immediately before and immediately after the signal from the specific head is sampled. The low frequency components, however, affect all of the heads equally. The effect of drop-outs is disturbing largely because of their high degree of contrast with the average level of illumination of the picture area in which they occur. The repetition rate of the television images is so high that if the average level of illumination of the screen is unchanged by them there is no effect of loss of detail, for the detail is supplied by preceding and succeeding images.

The primary object of the present invention is to prevent drop-outs in magnetic reproduction of television images from producing noticeable effects [uopn] *upon* the quality of the images reproduced. In greater detail, among the objects of the invention are to provide means and methods of maintaining lower frequency components of the picture signals at substantially a constant level, thus preventing drop-outs from affecting more than individual picture points; to provide means for reproducing recorded signals which introduces into the reproducer output the low frequencies in a manner which is substantially free of drop-out effects and is not disturbed by either a single pulse or a plurality of pulses introduced into any one channel or a plurality of channels by defects in the reproducing medium; to provide a general method of drop-out suppression which may be applied in a number of alternative ways and which, by introducing additional refinements can accomplish the suppression of the drop-out effect to almost any degree desired where the requirements are more severe and additional complication is warranted; to provide methods of and means for recording low-frequency components of television signals which are substantially resistant to drop-out effects; to provide means whereby low-frequency components, recorded by frequency modulation instead of amplitude modulation, can be added to the amplitude-modulated high-frequency components; to provide means for comparing the lower frequency components as recorded on the individual, amplitude-modulated tracks with those same components as modulated on the frequency-modulated tracks, and of adding to the outputs of the various amplitude modulated channels only enough low frequency components to compensate for the loss thereof due to the drop-outs; and to provide the means and methods of compensating for drop-outs wherein one or two channels and tracks provide drop-out compensation for all of the multiple tracks on which detail is recorded, in contradistinction to prior methods of compensation wherein a plurality of transducer heads and a plurality of tracks have been provided to insure against drop-outs in each individual track.

Considered broadly, in accordance with the present invention the television signal to be recorded and reproduced is amplitude-modulated upon a plurality of phase-displaced carriers of the same frequency, as has already been described, and is recorded on a plurality of parallel tracks on a common medium. In addition the same signal is preferably frequency-modulated upon a carrier, the frequency whereof may be approximately the same as that used to carry the amplitude-modulated signals. The frequency-modulated carrier is recorded upon additional parallel tracks on the same medium. In reproduction, the signals recorded on the amplitude-modulated tracks are picked up as has already been described and the components of these signals representative of the lower frequency components are subtracted from the signals developed from the individual tracks. Simultaneously there is developed from a plurality of the tracks a signal representative of the lower-frequency components common to all of the tracks; preferably the last-mentioned signal is derived from the frequency-modulated tracks above mentioned, but it may, instead, be derived by combining the lower-frequencies from enough of the amplitude-modulated tracks to insure that it is substantially drop-out free. This latter signal is added to those from the individual tracks, from which the lower frequencies have been removed, and thereafter the signals are sampled and the samples combined to reconstruct the television signal, with the effect that the average effective level is restored and a drop-out will present no sharp contrast with adjacent portions of the image.

The invention will be more clearly understood by reference to the accompanying drawings and the detailed description thereof which follow. In these drawings.

Figure 1:
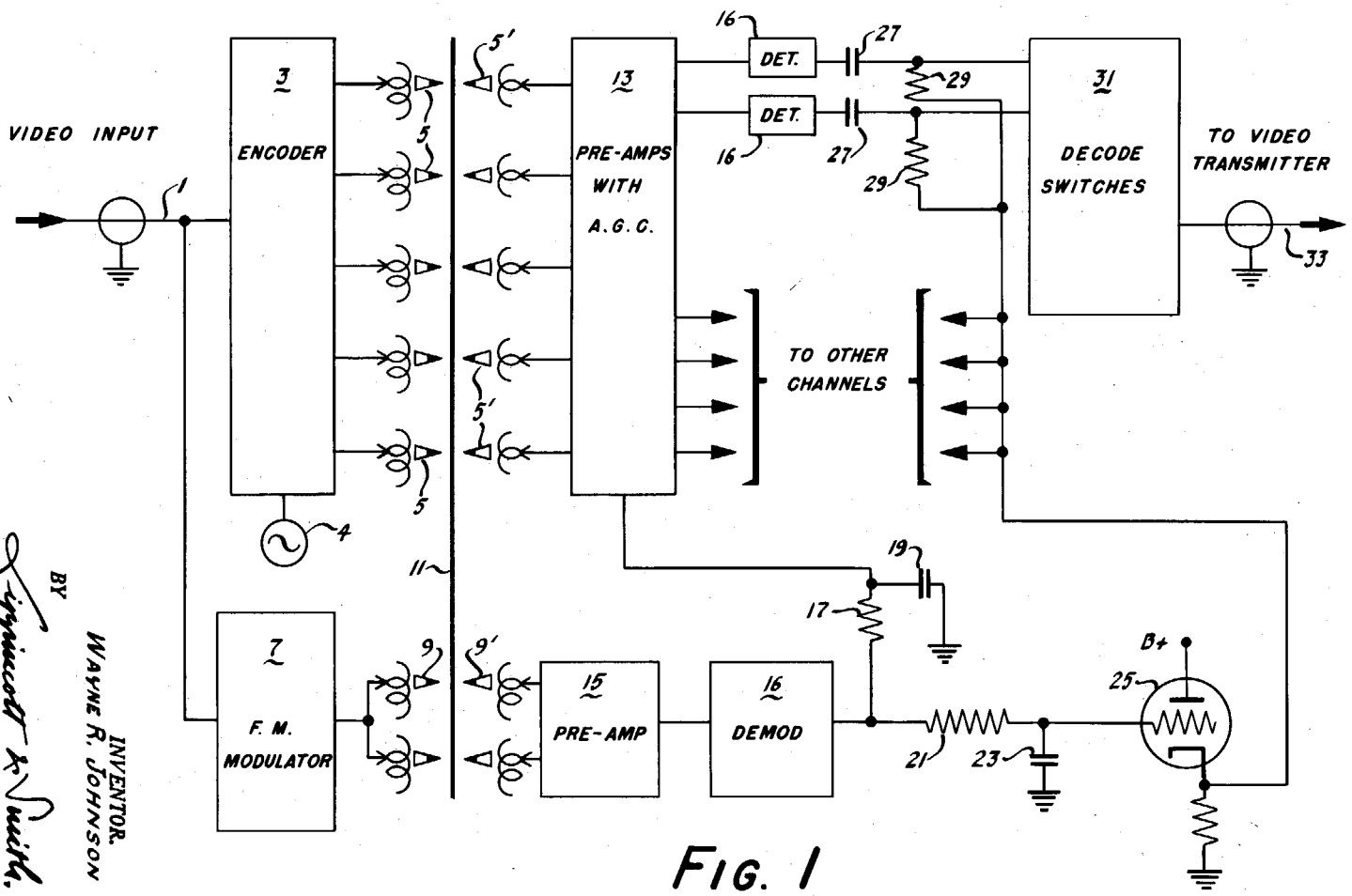
Fig. 1 is a diagram, largely in block form, illustrating the invention in a simple form.

Considering first the primary form of the invention illustrated in Fig. 1, the drawing shows, in block form, the equipment utilized for both recording and reproducing a television signal. Such a signal may be developed directly from a camera chain, in immediate proximity to the recording equipment, or it may be received over a radio channel. In any event it is applied to a terminal 1, representing the common input to all the recording channels. It is fed to an encoder 3, wherein it is modulated upon a plurality of phase-displaced carriers of the same frequency, as is described for example, in the copending application of the present inventor, Serial No. 272,083 above identified. The encoder there shown comprises a group of double balanced modulators of the ring type, one modulator being provided for each channel into which the signal is to be divided for recording purposes. As is well known, such modulators comprise three conjugate circuits, two inputs and one output. One of the input circuits of each modulator is connected to the input terminal 1. The other input circuit is connected to a sectional delay line which is provided with as many taps as there are modulators, the delay between successive taps being equal and the total delay being $$\frac{n-1}{2n}p$$

where p is the period of the carrier frequency. The output circuits of the various modulators are each connected to a separate recording head. As the modulators are of a double balanced type no signal appears in the output circuit unless there are signals applied to both circuits. The delay line is supplied with sharp pulses of the carrier frequency, positive and negative pulses alternating in alternate half-cycles. As a pulse reaches the modulators in succession each instantaneously passes a pulse of current whose amplitude is proportional to the instantaneous magnitude of the signal and whose sign, positive or negative, depends on the sign of the delay line pulse. In the specific embodiment there described the signal is sampled by pulses derived from a 169.5 kc. oscillator 4 fed into separate channels in which the pulses are phase-displaced by increments of 18°. Pulses are derived from both positive and negative halves of the waves, resulting in wave crests, either positive or negative, every 18 electrical degrees of the 169.5 kc. carrier. As a result of this arrangement, considering all ten channels, 3,390,000 samples per second are taken of the television signal. Each channel supplies a recording head 5, which is substantially of conventional form, although the gap in the magnetic circuit of the recorder head is preferably somewhat narrower than that used in recording sound.

The same video signal is fed to a frequency modulator 7, which may be of any conventional type, and is modulated on a carrier in the same general range as the 169.5 kc. frequency, so that it will permit recording and reproduction of frequencies up to about 1/10 of the maximum picture frequencies to be reproduced. The frequency-modulated signal is supplied to a recording head 9 and recorded upon the same magnetic tape in parallel to the tracks produced by the amplitude-modulated signals. As an added precaution the same signal is supplied to two transducer heads, in parallel to avoid effects of drop-outs on the FM signals.

Signals are recorded, as has been stated, in parallel tracks upon the same medium, which, in practice, is a plastic tape, coated with finely divided iron oxide, the tape being symbolized by the line 11 which, in the diagram, separates the recording and reproducing equipment. In reproduction this is picked up by transducer heads 5' and 9', which may, in fact, be the same heads as were used for recording or they may be embodied in entirely separate equipment; they must, however, be similarly arranged so that they will engage tracks in which the phases are displaced in the same order, in-so-far as the amplitude-modulated tracks are concerned and the transducer head 9' must engage a frequency-modulated track in order that the resultant signal may be operated upon properly.

The signals from the amplitude-modulated tracks are fed to individual preamplifiers 13, each of which is provided with an automatic gain-control circuit. The time constant of the gain control circuits as built into the amplifier should be less than the period of the highest frequency waves supplied from the FM tracks; otherwise they are conventional.

The FM signals also are fed to a preamplifier 15 and thence to a frequency demodulator 16 for demodulating the FM signal, deriving the modulating components therefrom. The output from the demodulator is again divided into two paths. One of these paths feeds through an integrating or filter circuit comprising a series resistor 17 and a shunt capacitor 19. The integrating circuit has a time constant of the order of the period of one scanning line, or 63 microseconds. Its effect is to filter from the signal any remaining higher frequency components. The resultant signal is supplied to the automatic gain controls of the preamplifiers 13 so as to reduce the amplification with increase of the control signal.

The second low-frequency-component path is through a second integrating circuit comprising a series resistor 21 and shunt condenser 23, substantially identical with that in the first path, or, at least, having substantially the same time constant. From the integrating circuit there is a connection to the grid of a cathode follower 25, which supplies sufficient power to restore the low-frequency components at the same amplitude and in proper phase to all the output circuits of the preamplifiers 13, through decoupling resistors 29.

It will be recognized that the changes in gain of the preamplifiers 13, which result from the automatic gain control signals constitute, in fact, a modulation process. A ready method of controlling the gain is the one most commonly used in automatic gain controls, i.e., the use of remote cut-off pentodes, whose amplification varies with the grid bias. The only real difference between this arrangement and the conventional one used on many radio and television receivers is that the integration of the signal used to control the gain is derived for all the amplifiers in common from the integrating circuit 17, 19.

Each of the output circuits, containing both high and low frequency components, leads to an individual switch in a decoder 31, which, actuated by a carrier wave derived from one or more of the recorded sound tracks, samples the various signals at the proper epoch of the carrier cycle, effectively connecting the circuit with which each switch is associated instantaneously to a common output line 33. Since this process is no portion of the present invention and since various types have been shown in the copending applications already identified, specifically, in Patent No. 2,694,748 they are not here described. The outputs of the various circuits, combined successively by the switching mechanism, form the reconstituted television signal, which thereafter is treated in the same manner as though picked up directly from a camera chain.

Figure 2:
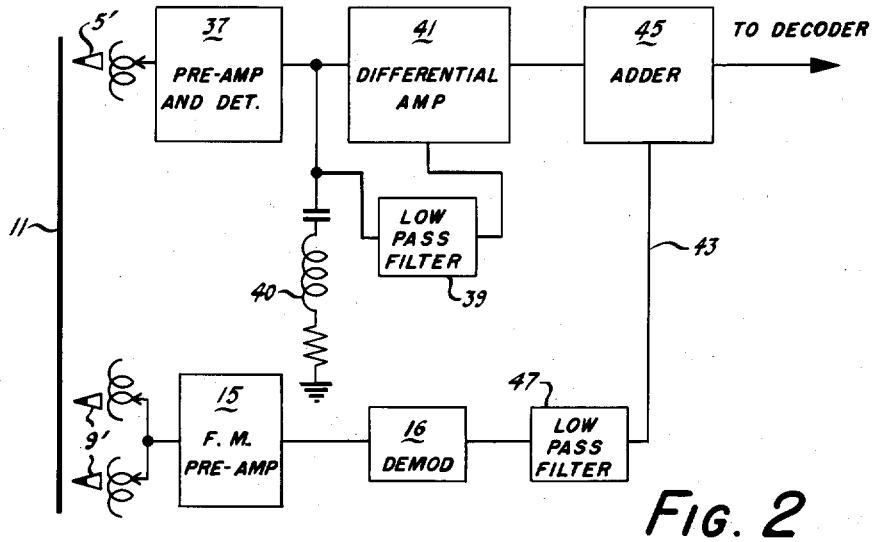
Fig. 2 is a block diagram of a modified form of the reproducing equipment for a single channel.

The circuit shown in Fig. 2 is a refinement of that shown in Fig. 1 and accomplishes the same result somewhat more accurately and in a little different manner. Only the reproducing portion of a single AM channel is shown, that of the other channels being mere duplication and the recording equipment being substantially identical with that already described in connection with the first figure, so that a repetition is believed to be unnecessary.

In this case, the amplitude-modulated signals as picked up from the tape are amplified and detected prior to their modulation by the low frequency components, the equipment for amplification and detection being symbolized by the single block 37. One branch of the output circuit 35 leads to a low-pass filter 39. This filter, as used in a specific apparatus here described, has a relatively sharp cut-off; its output is down only 3 db at 70 kc. but the attenuation at 100 kc. is 80 db. In parallel with the filter is an "overshoot suppressor" 40. The output of the filter 39 connects to a subtractor circuit 41, in this case a differential amplifier, one form of which will be described in detail hereinafter. Here it is sufficient to state that its effect is to subtract the low frequency components passed by the filter from the video signal as supplied from the lead 35 and feed them, via the lead 43, to a conventional adding network 45.

The FM signal from one or two tracks on the tape 11, is fed to a preamplifier 15 and thence to a demodulator 16 as before. The output from the demodulator passes to a low-pass filter 47, the characteristics of which are nearly as possible identical with those of low-pass filter 39. Because of these identical characteristics any phase-delays which may occur, or any failure of the phase-delay produced to be strictly proportional to frequency, will be the same in the two filters. Furthermore, any ringing in the filter output due to the sharp cut-off will also be the same in the two filters. The output of filter 47 is fed to the adding circuit 45 with the output of subtractor circuit, and the two signals are there combined. Tests have indicated that the resultant signal is substantially perfect, and that no spurious signals due to ringing, phase delays, or the like appear in the combined output circuit 49. The effect is a very nearly complete restoration of the low-frequency components in the output signals.

Figure 3:
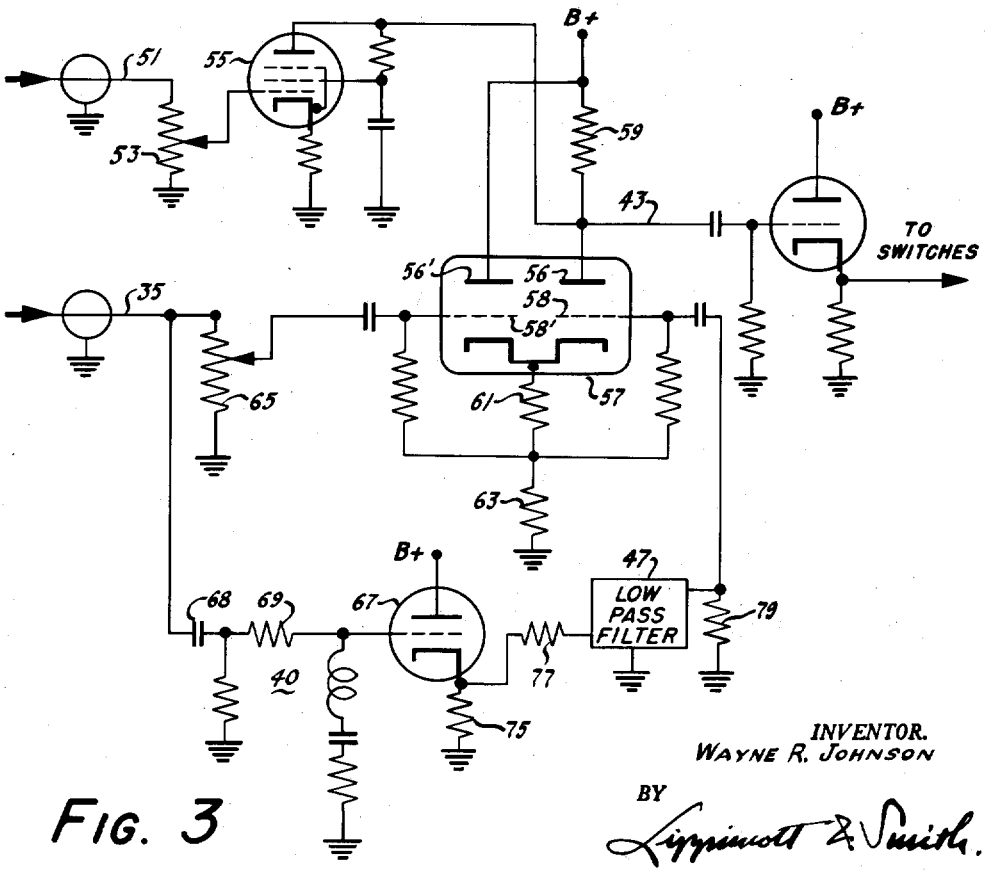
Fig. 3 is a schematic diagram of circuits employed in the equipment illustrated in Fig. 2.

The apparatus included in the subtractor 41 of Fig. 2 together with the adding circuitry, are illustrated in detail in Fig. 3. In this figure the line 51 represents the output circuit from the FM demodulator 16. Across this line is a potentiometer 53, and the variable tap of the potentiometer is connected to the control grid of a pentode amplifier 55. The plate of the amplifier connects in parallel with the plate 56 of one section of a twin triode 67, both of the plates being supplied through a common plate resistor 59 from a common source. The cathode and screen grid supplies to the tube 55 are conventional.

The other anode 56' of the twin triode 57 connects directly to B+, the common source of supply. The two cathodes of the twin triode are connected together and to ground through series coupling resistors 61 and 63. The grid 58' of one section of the twin triode (that in which no plate resistor exists in the anode circuit) is fed with the detected output of the AM channel through lead 35 from the preamplifier-detector 37 of Fig. 3. The signals from this circuit are also taken off from the movable contact of a potentiometer 65, terminating the line. Through the use of this potentiometer a desired portion of the voltage of the signal can be selected, and this can be balanced against the low frequency voltage taken off the potentiometer 53 from the FM circuit. The full voltage output is taken off through lead 35' and supplied to the control grid of a cathode follower tube 67 through a blocking condenser 68. The overshoot suppressor 40, connected between condenser 68 and the grid, comprising a series resistor 69 and a damped series resonant circuit 71 connecting to ground between the grid and resistor 69 may be included, but is not necessarily a part of this invention. Tube 67 is coupled by means of a cathode resistor 75 and a low value series resistor 77 with the low pass filter 47, the characteristics of which have already been described in connection with Fig. 2. The output of filter 47 connects to a matching impedance 79, and from the ungrounded side of the latter connection is made to the grid 58 of the section of tube 57 whose anode connects in parallel with tube 55.

The operation of the circuit as thus far described is as follows:

The signal from lead 35, containing both high and low frequency components, is applied to the grid 58' of tube 57. This tube is cathode-follower coupled to the cathode of the second section of the tube, passing this signal on to the cathode of the second section in substantially a 1:1 ratio, the cathode rising in potential to almost exactly the same degree as the grid 58', following all of the frequency components introduced from the amplitude-modulated tracks. At the same time, the same frequencies are passed to cathode-follower tube 67, and fed at unity gain to filter 41, which removes the high frequency components and applies the lower frequencies to grid 58 of tube 57. As far as the low-frequency components are concerned, this grid rises and falls in potential concurrently with and to the same degree as the cathode, and since, for these components, there is no difference in grid-cathode potential, the space current of the tube is not varied. There is no such concurrent variation with respect to the high frequency components, and therefore the space current of this section of the tube represents the latter components alone, down to the frequency of cut-off of the filter 47. These frequencies are reflected in the drop across resistor 59.

At the same time the low-frequency components, limited in frequency range by a filter identical with filter 41, are applied to the grid of tube 55, varying its space current accordingly. This current, flowing through the common resistor 59, produces a drop therein at the low frequencies only, thereby restoring the D.C. component minus any drop-outs that might be deflected in these components as supplied from the amplitude-modulated tracks. By adjusting the contact on potentiometer 65 the portion of the voltage, delivered by the amplitude-modulated tracks, which is supplied to the grid 58′ of tube 57 can be so adjusted as to compensate for the insertion losses introduced by the filter 47 and its input and output circuits, so that the low-frequency components can be balanced out with great accuracy. Similarly, the potentiometer 53 can be so adjusted as to build up the reintroduced components to match the normal amplitude of these components, excluding drop-outs. Output lead 43 therefore carries the reestablished signal for delivery to the switches.

Because of the methods of modulation and synchronization used under present standards of television transmission, it is not, in fact, necessary that the low-frequency components supplied actually include D.C. or zero frequency. The lowest frequency component which appears in the television signal at any material amplitude is the 60 cycle field frequency. When the average illumination of the field changes there is a change in the D.C. component, but since the signal falls to zero level when the synchronizing pulses occur the D.C. level is always equal to the average amplitude of the A.C. components and can most readily be supplied by a D.C. restorer after the signals from all channels have been combined, in the same manner as this component is ordinarily supplied in receivers. It is therefore satisfactory if the low-frequency cut-off is somewhat below the 60 cycle fundamental of normal transmission. Circuitry is somewhat simplified thereby and direct-coupled amplifiers are avoided. It will be seen that A.C. coupling can be used in the subtractor circuit, wherefrom the low-frequencies are to be removed in any event, but it is also convenient to use A.C. coupling in the output circuits after the other low frequencies have been restored.

Figure 4:
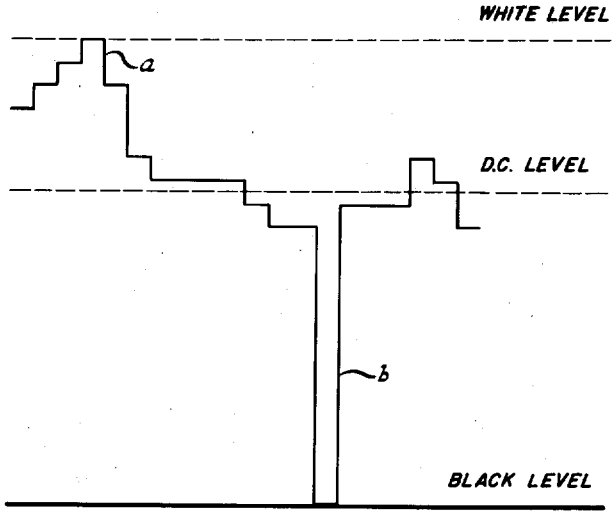
Fig. 4 is an idealized graph of a reproduced television waveform.
Figure 5:
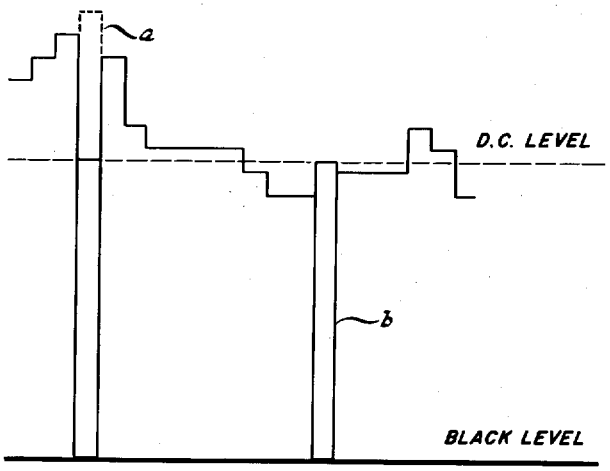
Fig. 5 is a similar graph of the same waveform, including the effect of a drop-out in one channel.

What the visual effect of the two forms of the invention shown will be is illustrated in Figs. 4 and 5. Fig. 4 shows an idealized signal, comprising 20 samples or 1 complete cycle of the sampling frequency in each of the ten channels. For the purpose of the illustration it is assumed that the first sample taken from channel 4 is a highlight, representing a single detail of maximum illumination in the line of the picture to be reproduced whereas the second sample taken from the same channel is a black detail, where the signal level falls to zero. The white level, the black level, and the average illumination or "D.C. level" are represented by the lines so labeled in the figure. If, now, there is a drop-out in channel 4, the resultant signal, without compensation, would be that shown in Fig. 5 by the solid lines illustrating the waveform. The D.C. level would be dropped slightly, and in place of the high light in the first sampling of channel 4 (designated as "a" in both figures) a black dot would be shown.

With compensation the sample from channel No. 4 will be shown at average brightness. The highlight will be omitted, but so will the black dot of the drop-out. In the second sampling, the black detail would also be omitted, the signal also showing the average illumination. In this portion of the screen as a whole there will be no streak of either light or dark. On the next scanning of that particular portion of the field the probability is very great that no drop-out will occur, and since the scannings come so rapidly that the eye integrates the effects, and since, moreover, small variations in contrast affect the eye substantially linearly whereas at high degrees of contrast the response approaches the logarithmic the result of repeated scannings is that the bright portions of the picture still appear bright and the dark portions dark. There is still a drop-out of detail but not of average illumination, and the disturbing effect of the drop-out substantially vanishes.

The idealized waveform has been so drawn as to show the worst situation with which the invention is required to cope, i.e., where the elements dropped out are at the extremes of contrast with the average of the scene being reproduced. The greatest probability, of course, is that the drop-outs will occur at the average value of illumination. Under these circumstances it would be invisible even in the absence of a preceding and succeeding frame.

The effects produced by the two forms of the invention shown are very nearly identical. Owing to the type of filters and methods of removing and replacing "D.C. level" or average level of illumination, the latter is averaged over a much shorter period in the second form shown. In the form first described the subtraction of the low-frequency components is accomplished before the detection of the signal by a modulation process. It is because of this fact that the low-frequency components which are subtracted can be derived from the drop-out-free signals instead of from the individual channel without merely subtracting and adding the same signal and leaving the result the same as before. The signals in all channels drop to zero level during each synchronizing pulse and when this occurs the wave vanishes completely: it represents 100% modulation in the negative direction. A drop-out also appears as a fall of the signal to zero level and an attempt to subtract the drop-out-free signal cannot reduce it further. Therefore the lower frequency components are subtracted only to the extent that they are actually present in the individual channel affected. When the drop-out-free signals are added thereafter they therefore raise the low-frequency components to their proper value above zero.

In the second form of the device, where the lower frequencies are subtracted after detection, the components of all frequencies are superimposed on the D.C. components in the space currents of the various amplifier tubes, and to insure linearity these tubes are not carried to cut-off by zero-level signals. Therefore if the drop-out-free components were used for the subtraction they could reduce the signal to negative values, and their addition later would merely restore the original signal in each channel including the drop-outs. Therefore when post-detection subtraction is employed the subtracted signal must be derived from the channel itself. The subtracted signals represent, electrically, "negative illumination," which has no physical existence, but in neither case do such signals appear in the output circuits. The low frequency components are reduced to the level representative of zero illumination and do not go negatively beyond that level. In the first instance, it is because negative modulation can have no more physical existence in the circuits than can negative illumination; in the second case the negative components subtracted are derived from the same signal and hence are necessarily equal to the positive components.

While the use of frequency modulated tracks is advantageous it is not the only means whereby a drop-out-free train of low-frequency components can be attained. It is possible to combine the low-frequency components as derived from all of the amplitude-modulated tracks and, filtering out the high frequency components as before, use the combined signal to supply the drop-out-free low-frequencies. If these low frequencies are merely added, a drop-out in one channel will reduce their amplitude by one-tenth, in the form of apparatus here shown. This can be overcome by picking signals from a number of tracks and feeding them to a comparator circuit in which that of highest amplitude is chosen, which avoids this difficulty.

In general, however, the use of the frequency modulated tracks is preferred since the amplitude need not then affect the level of the produced signals; the transducer heads, engaging two tracks, can then be connected in series or parallel and the resultant signals amplified and then limited so that the drop out of either channel will not affect the over-all result.

One point of importance with regard to any of the modifications of the invention is that while it relies upon a form of frequency division as between the high- and low-frequency components to be displayed in the picture, picking up the lower frequencies from certain tracks and the higher frequencies from others, it is not subject to the difficulties with respect to phase-rotation and variable delay in the filters used which have plagued systems using or attempting to use straight frequency division to accomplish the recording and reconstruction of television signals. With either modification of the invention, phase rotation will take place in the filters utilized to remove the lower frequency components from the amplitude-modulated signals and to restore those components in the output. Using either type of apparatus the subtraction process removes the in-phase components of the signal to a greater or less extent; in the case of the simple integrating circuits of Fig. 1, at the cross-over point, where the amplitudes of the two signals are equal, one-half of the amplitude of the cross-over frequency signal is supplied from the amplitude-modulated channels and the other half from the frequency-modulated or other low-frequency channels. At this frequency there will be a 45° phase rotation in the filter. This adds an out-of-phase component in the modulation from the AM channels, but because of the reverse modulation it is 180° out of phase with that in the modulating wave. It is therefore equal and opposite to the like component added to the signal after the demodulation process. The same holds true of any phase rotation that may occur near the cut-off frequency of the filters used in Fig. 2.

The principles involved in the various embodiments of the invention are identical, and the difference in results is a matter of degree only. Furthermore, the various features shown may be combined in various ways, and the invention may be modified as to the method of deriving the drop-out-free low frequencies as has already been described. The two forms of apparatus shown and described in detail are therefore not to be taken as limiting the scope of the invention, intended limitations being expressed in the following claims.

What is claimed is as follows:

1. Reproducing apparatus for compensating for the effect of drop-outs in television signals magnetically recorded as parallel tracks on a common medium, a plurality of said tracks recording modulations of carrier waves of a common frequency phase-displaced relatively to each other to produce substantially equal intervals between wave crests as recorded on the various tracks and the amplitude of successively occurring crests being representative of the illumination of successive elements along a scanning path of a field of view to be reproduced, which comprises: a plurality of transducer heads adapted to engage respectively each of said tracks, detector means connected to each of said transducer heads respectively for demodulating signals reproduced thereby, means for developing in a separate circuit signals representative of the lower frequencies only of the modulating components recorded on said tracks and means for subtracting said lower-frequency components from the demodultated signals; means for deriving from a plurality of different tracks than that engaging each respective head a signal representative of those same components subtracted from the demodulated output of such head, an adding circuit connected in the output of each of said demodulating means for adding thereto said last-mentioned signal, to restore the components removed unaffected by drop-outs in any individual track, and means for sampling each of the restored signals in rotation to reconstitute the recorded signal.

2. Apparatus as defined in claim 1 wherein said lower-frequency-subtracting means comprises means for modulating said signals negatively on the signals picked up by each of said transducer heads prior to the demodulation of said signals.

3. Apparatus as defined in claim 1 wherein said lower-frequency-subtracting means comprises a differential amplifier responsive only to the difference in amplitude of the signals supplied thereto.

4. Apparatus as defined in claim 1 wherein said different tracks are frequency-modulated, and comprising additional transducer heads adapted to engage said frequency-modulated track and means for demodulating the signals developed by said additional heads to provide the low-frequency components to be added to the signals from all of the first-mentioned tracks.

5. Reproducing apparatus for compensating for the effect of drop-outs in television signals magnetically recorded as parallel tracks on a common medium, a plurality of said tracks recording modulations of carrier waves of a common frequency phase-displaced relatively to each other to produce substantially equal intervals between wave crests as recorded on the various tracks and the amplitude of successively occurring crests being representative of the illumination of successive elements along a scanning path of a field of view to be reproduced, which comprises: a plurality of transducer heads adapted to engage respectively each of said tracks, detector means connected to each of said transducer heads respectively for demodulating signals reproduced thereby, divided circuits connected to said demodulating means, a differential amplifier having one input terminal connected directly in one branch of each of said circuits, low-pass filter means connected in the other branch of each of said circuits, connections from said low-pass [filters] *filter means* to another input terminal of the respective differential amplifiers, a plurality of additional transducer heads adapted to engage tracks on said common medium, means for demodulating the signals developed by said additional heads, low-pass filter means having substantially identical characteristics as said first-mentioned filter means connected to receive the output of said last-mentioned demodulating means, and means for adding signals passed by said last-mentioned filter means to the output signals from each of said differential amplifiers.

6. Reproducing apparatus for compensating for the effect of drop-outs in television signals magnetically recorded as parallel tracks on a common medium, a plurality of said tracks recording modulations of carrier waves of a common frequency phase-displaced relatively to each other to produce substantially equal intervals between wave crests as recorded on the various tracks and the amplitude of successively occurring crests being representative of the illumination of successive elements along a scanning path of a field of view to be reproduced, which comprises: a plurality of transducer heads adapted to engage respectively each of said tracks, detector means connected to each of said transducer heads respectively for demodulating signals reproduced thereby, divided circuits connected to said demodulating means, a differential amplifier having one input terminal connected directly in one branch of each of said circuits, low-pass filter means connected in the other branch of each of said circuits, connections from said low-pass filters to another input terminal of the respective differential amplifiers, a plurality of additional transducer heads adapted to engage tracks on said common medium, frequency demodulating means connected to demodulate the common output of said additional *transducer heads,* an additional low-pass filter means having like characteristics to those first-mentioned connected for supply by said frequency-demodulating means, and means for adding output signals from said additional filter means to signals developed by each of said differential amplifiers.

7. Reproducing apparatus for compensating for the effect of drop-outs in television signals magnetically recorded as parallel tracks on a common medium, a plurality of said tracks recording modulations of carrier waves of a common frequency phase-displaced relatively to each other to produce substantially equal intervals between wave crests as recorded on the various tracks and the amplitude of successively occurring crests being representative of the illumination of successive elements along a scanning path of a field of view to be reproduced which comprises: a plurality of transducer heads adapted to engage respectively each of said tracks, detector means connected to each of said transducer heads respectively for demodulating signals reproduced thereby, divided circuits connected to said demodulating means, a differential amplifier having one input terminal connected directly in one branch of each of said circuits, said differential amplifier including an output resistor, *low pass filter means connected in the other branch of each of said circuits, connections from said low pass filter means to another input terminal of the respective differential amplifiers, a plurality of additional transducer heads adapted to engage tracks on said common medium,* frequency demodulating means connected to demodulate the common output of said additional *heads,* an additional low-pass filter means having like characteristics to those first-mentioned connected for supply by said frequency-demodulating means, a plurality of amplifiers connected for supply by said additional filter means, each having as an output impedance the output resistor of one of said differential amplifiers, thereby to add to signals developed by said differential amplifiers lower-frequency components from signals transduced by said additional heads.

8. In a system for magnetically recording and reproducing television signals wherein a plurality of carrier waves, phase displaced respectively by equal increments collectively to provide equally spaced wave crests, are modulated in rotation by samples representing the illumination of successive elements of a field of view and are recorded as parallel tracks on a common medium, the method of compensating for drop-outs in reproduction caused by imperfections in such medium which comprises the steps of scanning all of said track simultaneously to develop in separate channels wave trains representing the signals as recorded, developing waves representative of only the lower frequencies modulated on the recorded waves, subtracting from the waves in each channel the frequencies representative of said lower frequency components in the waves developed therein, simultaneously developing from waves in a plurality of channels waves representative of the lower frequency components which should be present in all channels, adding the last mentioned waves to the waves in all channels, and sampling the waves in the various channels in rotation to reconstruct the recorded signals.

9. The method as defined in claim 8 wherein the subtraction and addition of said lower frequency components are accomplished by the subsidiary steps of detecting the waves developed in said plurality of channels, filtering said waves to remove the higher-frequency components therefrom, inversely modulating the waves in each of said separate channels by said filtered waves, detecting the waves in each of said filtered waves to the detected waves in each of said separate channels prior to sampling them.

10. The method as defined in claim 8 wherein the subtraction and addition of said lower frequency components is accomplished by the subsidiary steps of detecting the waves in each of said separate channels, filtering from a portion of the detected waves the higher frequency components therein, subtracting the filtered waves from another portion of the detected waves in the same channel, detecting the waves developed from said plurality of channels, filtering said last mentioned waves to remove the higher-frequency components therefrom, and adding the filtered waves from said plurality of channels to the higher-frequency components remaining in each of said separate channels prior to sampling them.

*11. In a reproducing system for compensating wide band amplitude-modulated television signals for effects caused by imperfections in a recording medium upon which the amplitude-modulated signals are recorded to represent information and upon which frequency-modulated signals are recorded to represent a portion of the information represented by the amplitude-modulated signals, first means responsive to the frequency-modulated signals recorded on the medium for reproducing such signals, second means responsive to the amplitude-modulated signals recorded on the medium for reproducing such signals, demodulating means coupled to the first means for converting the frequency-modulated signals from the first means into signals modulated in amplitude in accordance with the modulation in frequency of the frequency-modulated signals, and means coupled to the second means and to the demodulating means for substituting the amplitude-modulated signals from the demodulating means for the corresponding portion of the amplitude-modulated signals from the second means to obtain composite signals having information derived from both the frequency-modulated signals and the amplitude-modulated signals recorded on the medium.*

*12. The combination set forth in claim 11 in which the substituting means includes means responsive to the signals from the demodulating means and to the signals from the second means for obtaining the difference between the signals from the demodulating means and the signals from the second means to produce resultant signals and in which the substituting means further includes means responsive to the resultant signals from the subtracting means and to the signals from the demodulating means for combining these signals to produce composite signals representing the information.*

*13. In a recording-reproducing system for compensating for defects in a recording medium, means operatively coupled to the medium for recording on the medium information in the form of amplitude-modulated signals where the amplitude modulations represent the information, means operatively coupled to the medium for recording on the medium at least a first particular portion of the information in the form of frequency-modulated signals where the frequency modulations represent the particular portion of the information, first means responsive to the amplitude-modulated signals recorded on the medium for reproducing such signals, second means responsive to the frequency-modulated signals recorded on the medium for reproducing such signals, demodulating means coupled to the second reproducing means for converting such signals into signals having amplitude modulations dependent upon the frequency modulations of the frequency-modulated signals, and means coupled to the demodulating means and to the first reproducing means for substituting the amplitude-modulated signals from the demodulating means for the corresponding portion of the amplitude-modulated signals from the first reproducing means to obtain composite signals representing the information.*

*14. The system set forth in claim 13 in which the substituting means includes means responsive to the signals from the demodulating means and from the first reproducing means for subtracting the signals from the demodulating means from the signals from the first reproducing means and in which the substituting means further includes means responsive to the signals from the demodulating means and the signals from the subtracting means for combining these signals to produce composite signals representing the information.*

*15. The combination set forth in claim 13 in which the substituting means includes means responsive to the signals from the first reproducing means for producing signals having a first range of frequencies where the first range of frequencies represents a second particular portion of the information and where the first and second particular portions of the information constitute the information represented by the amplitude-modulated signals recorded on the medium and in which the substituting means further includes means responsive to the signals in the first particular range of frequencies and the signals from the first reproducing means for subtracting the signals in the first particular range of frequencies from the signals from the first reproducing means to produce signals in a second particular range of frequencies and in which the substituting means further includes means responsive to the signals in the second particular range of frequencies and responsive to the signals from the demodulating means for combining such signals to produce composite signals representing the information.*

*16. In a reproducing system for compensating for the effects of imperfections on a surface upon which amplitude-modulated signals and frequency-modulated signals are recorded where the amplitude-modulated signals represent information and where the frequency-modulated signals represent only a portion of the information represented by the amplitude-modulated signals and where the amplitude-modulated signals have a particular range of frequencies, first means responsive to the amplitude-modulated signals recorded on the surface for producing electrical signals having amplitude modulations corresponding to those of the amplitude-modulated recorded signals, second means responsive to the frequency-modulated signals recorded on the surface for producing electrical signals having characteristics corresponding to those of the frequency-modulated recorded signals, frequency discriminating means coupled to the first means for separating the modulating components of the amplitude-modulated electrical signals from the first means into signals having a first range of frequencies and signals having a second range of frequencies where the second range of frequencies represents the portion of the information corresponding to that provided by the frequency-modulated signals and where the first and second range of frequencies constitute the particular range of frequencies, demodulating means coupled to the second means for converting the frequency-modulated signals from the second means into signals having amplitude modulations dependent upon the frequency modulations of the frequency-modulated signals, and means coupled to the separating means and to the demodulating means for combining the signals from the demodulating means with the amplitude-modulated signals in the first range of frequencies.*

*17. In a recording-reproducing system for compensating wide band amplitude-modulated signals having a particular range of frequencies for effects caused by imperfections in a recording medium upon which the amplitude-modulated signals are recorded to represent information and upon which frequency-modulated signals are also recorded to represent a portion of the information represented by the amplitude-modulated signals, first means responsive to the frequency-modulated signals recorded on the recording medium for reproducing such frequency-modulated signals, second means responsive to the amplitude-modulated signals recorded on the recording medium for reproducing such amplitude-modulated signals, means coupled to the second reproducing means for separating signals having a first frequency range from the amplitude-modulated signals where the first frequency range represents the portion of the information corresponding to that represented by the frequency-modulated signals, means coupled to the separating means and to the second reproducing means for subtracting the signals in the first range of frequencies from the amplitude-modulated signals produced by the second reproducing means to produce signals in a second range of frequencies where the first and second ranges of frequencies constitute the particular range of frequencies, means coupled to the first reproducing means for demodulating the frequency-modulated signals from the first reproducing means into signals having amplitude modulations dependent upon the frequency modulations of the frequency-modulated signals, and means coupled to the demodulating means and to the subtracting means for combining the amplitude-modulated signals from the demodulating means and the signals in the second range of frequencies from the subtracting means to produce composite signals representing the information.*

*18. In a reproducing system for compensating for the effects of imperfections on a surface upon which first signals are recorded with a particular range of frequencies and with amplitude modulations to represent information and upon which second signals are recorded to represent a first particular portion of the information, first means responsive to the first signals recorded on the medium for producing signals having amplitude modulations corresponding to the amplitude modulations of the recorded signals, second means responsive to the second signals recorded on the medium for producing signals having amplitude modulations in accordance with the particular portion of the information represented by such second recorded signals, amplifier means responsive to the amplitude-modulated signals produced by the first means for passing amplitude-modulated signals in a first range of frequencies where the amplitude-modulated signals in the first range of frequencies represent a second particular portion of the information combining with the first particular portion of the information to represent the information, and means responsive to the amplitude-modulated signals in the first range of frequencies from the amplifier means and the amplitude-modulated signals from the second means for combining such signals to produce resultant signals representing the information, the amplifier means including means responsive to the signals from the first means for producing signals in a second range of frequencies where the first and second ranges of frequencies constitute the particular range of frequencies and where the signals in the second range of frequencies represent the first particular portion of the information, the amplifier means further including means responsive to the signals in the second range of frequencies and to the signals from the first means for subtracting the signals in the second range of frequencies from the signals from the first means to produce the signals in the first range of frequencies.*

References Cited in the file of this patent
or the original patent

UNITED STATES PATENTS

| | | |
|---|---|---|
| 2,352,696 | De Boer et al. | July 4, 1944 |
| 2,517,808 | Sziklai | Aug. 8, 1950 |
| 2,710,347 | Brady | June 7, 1955 |
| 2,791,640 | Wolfe | May 7, 1957 |
| 2,854,624 | Lubkin | Sept. 30, 1958 |